(12) United States Patent
Suhara et al.

(10) Patent No.: US 6,411,496 B1
(45) Date of Patent: *Jun. 25, 2002

(54) ELECTRIC DOUBLE LAYER CAPACITOR AND SEPARATOR THEREFOR

(75) Inventors: Manabu Suhara; Kazuya Hiratsuka; Takeshi Kawasato, all of Kanagawa (JP)

(73) Assignee: Asahi Glass Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/358,488

(22) Filed: Jul. 22, 1999

(30) Foreign Application Priority Data

Jul. 24, 1998 (JP) ............................................. 10-209929

(51) Int. Cl.[7] ................................................. H01G 9/02
(52) U.S. Cl. ....................... 361/502; 361/503; 361/504; 361/512
(58) Field of Search ................................. 361/500, 502, 361/503, 504, 511, 512; 29/25.03; 429/142, 144

(56) References Cited

U.S. PATENT DOCUMENTS

| 4,697,224 A | * | 9/1987 | Watanabe et al. ............ 361/502 |
| 4,862,328 A | * | 8/1989 | Morimoto et al. ........... 361/502 |
| 5,157,586 A | | 10/1992 | Lallemand .................... 361/324 |
| 6,072,693 A | | 6/2000 | Tsushima et al. ............ 361/502 |
| 6,104,600 A | * | 8/2000 | Suhara et al. ................ 361/502 |
| 6,349,027 B1 | | 2/2002 | Suhara et al. ................ 361/502 |

FOREIGN PATENT DOCUMENTS

| JP | 04167355 A | * | 6/1992 | ............. H01G/9/00 |
| JP | 08045788 A | * | 2/1996 | ............. H01G/9/00 |

OTHER PUBLICATIONS

U.S. application No. 09/515,318, filed Feb. 29, 2000, pending.

* cited by examiner

*Primary Examiner*—Dean A. Reichard
*Assistant Examiner*—Eric W. Thomas
(74) *Attorney, Agent, or Firm*—Oblon, Spivak, McClelland, Maier & Neustadt, P.C.

(57) ABSTRACT

An electric double layer capacitor having an element impregnated with a non-aqueous electrolyte, said element comprising positive and negative electrodes made of carbonaceous electrodes, and a separator interposed between the electrodes, wherein said separator is made of at least two paper layers laminated to form one sheet, each of the paper layers has a thickness of from 20 to 60 $\mu$m, and at least one of the paper layers is a cellulose paper layer having a density of from 0.37 to 0.60 g/cm$^3$.

9 Claims, No Drawings

ELECTRIC DOUBLE LAYER CAPACITOR AND SEPARATOR THEREFOR

The present invention relates to a non-aqueous type electric double layer capacitor which has a high power output and a high energy density and which is excellent in a voltage-holding property.

Heretofore, as a separator to be disposed between positive and negative electrodes of an electric double layer capacitor, a polyethylene non-woven fabric, a polypropylene non-woven fabric, a polyester non-woven fabric, kraft paper, a rayon/sisal mixed sheet, a Manila hemp sheet or a glass fiber sheet is, for example, known (e.g. JP-A-9-45586, JP-A-1-304719). The role of a separator is to electrically insulate the positive electrode from the negative electrode on one hand and to facilitate transfer of ions in the electrolyte, which takes place accompanying charge and discharge, on the other hand.

In recent years, an attention has been drawn to an electric double layer capacitor for large current charge and discharge. However, with a separator of e.g. a polyethylene non-woven fabric, the ion conductivity is low, and the internal resistance of the electric double layer capacitor is high, since the liquid absorbing property and the liquid-holding property for the electrolyte are low. Accordingly, if instantaneous large current discharge was carried out as one of main characteristics of an electric double layer capacitor, the voltage drop was substantial, such being not practical.

Further, a conventional separator made of paper is excellent in heat resistance and tensile strength and is sometimes effective for an electric double layer capacitor to be used for a power source whereby no large current discharge is carried out, like a hybrid power source with a solar cell. However, when a conventional separator made of paper is used for an electric double layer capacitor for large current charge and discharge, wherein the electrolyte is non-aqueous, the ion permeability tends to be inadequate.

With an electric double layer capacitor for large current charge and discharge, it is desired to lower the resistance and to increase the capacitance per unit volume (hereinafter referred to as a capacitance density), and it is accordingly required to make the separator as thin as possible. From the viewpoint of the liquid-absorbing property and the liquid-holding property for the electrolyte, the separator is required to have a high porosity. However, if a separator made of paper having a high porosity, is made thin, the insulating property between the positive and negative electrodes tends to be inadequate, thus leading to microshortcircuiting, self-discharge or decrease in the yield for the production of capacitors.

Further, when an electric double layer capacitor having a large capacitance is to be produced, a plurality of positive and negative electrodes may alternately be laminated with a separator interposed therebetween, or elongated positive and negative electrodes may be wound with a separator interposed therebetween, to form an element having the electrodes and the separator intimately laminated, and usually, an electrolyte is impregnated to such an element. Accordingly, especially when the viscosity of the electrolyte is relatively high, the separator is required to be excellent not only in the liquid-absorbing property and the liquid-holding property for the electrolyte, but also in the impregnation property for the electrolyte. Otherwise, there will be a problem that the productivity tends to be poor.

Under these circumstances, it is an object of the present invention to realize reduction of the resistance and increase of the capacitance for an electric double layer capacitor by employing a separator which is excellent in heat resistance and ion permeability and which, at the same time, is excellent in the liquid-absorbing property, the liquid-holding property and the impregnation property for an electrolyte even if it is thin, and has high strength and excellent insulating properties.

The present invention provides an electric double layer capacitor having an element impregnated with a non-aqueous electrolyte, said element comprising positive and negative electrodes made of carbonaceous electrodes, and a separator interposed between the electrodes, wherein said separator is made of at least two paper layers laminated to form one sheet, each of the paper layers has a thickness of from 20 to 60 $\mu$m, and at least one of the paper layers is a cellulose paper layer having a density of from 0.37 to 0.60 g/cm$^3$; and the separator for such a capacitor.

Now, the present invention will be described in further detail with reference to the preferred embodiments.

The separator in the present invention is a paper (hereinafter referred to as a multilayered paper) prepared by laminating at least two paper layers into one sheet on a paper-making machine, and each of the paper layers has a thickness of from 20 to 60 $\mu$m. With paper layers having a thickness of less than 20 $\mu$m, the strength tends to be weak, and the handling tends to be difficult when they are laminated by a paper-making machine. On the other hand, if the thickness exceeds 60 $\mu$m, when a separator is made by laminating a plurality of such paper layers, the volume of the separator occupying per unit volume of the electric double layer capacitor, tends to be large, whereby the capacitance density of the electric double layer capacitor can not be made adequately high. The paper-making machine to be used for making the multilayered paper, is preferably combination machine.

Further, in the present invention, at least one of the above-mentioned paper layers has a density of from 0.37 to 0.60 g/cm$^3$. If a separator is made solely of paper layers having a density of less than 0.37 g/cm$^3$, the positive and negative electrodes can not adequately be insulated. On the other hand, if the separator contains a paper layer having a density exceeding 0.60 g/cm$^3$, the ion permeability tends to be inadequate, and the resistance of the separator tends to be high. Preferably, the density is within a range of from 0.40 to 0.50 g/cm$^3$. Here, the porosity of the cellulose paper layer is determined solely by the starting material and the density. The separator made of the multilayered paper preferably has a porosity of from 60 to 90%, more preferably from 65 to 85%.

With a low density cellulose paper having an adequate porosity to provide the liquid-absorbing property and the liquid-holding property for an electrolyte, if the thickness is, for example, at most 100 $\mu$m, the capacitance density of an electric double layer capacitor can be made high, but pinholes are likely to be present. Accordingly, if a single sheet of cellulose paper having a thickness of at most 100 $\mu$m is used alone as a separator for an electric double layer capacitor, short circuiting may occur due to the pinholes, and self discharge is likely to take place.

Whereas, in the present invention, the separator is made of a plurality of paper layers laminated one on another, whereby the probability of formation of pinholes is very low by the lamination of a plurality of paper layers even though each paper layer may have pinholes, whereby the electric double layer capacitor will be scarcely susceptible to self discharge, and the yield in the production can also be increased. Namely, even with a separator having the same thickness, the separator made of a multilayered paper has a low probability of having pinholes and is less susceptible to self discharge, as compared with a usual separator made of a single sheet of cellulose paper.

In the present invention, the separator is preferably a multilayered paper or multi ply made of multilayers prepared by laminating two paper layers i.e. a double layered paper or double ply made of two layers. If the number of paper layers is too much, the separator tends to be thick, whereby the capacitance density of the electric double layer capacitor tends to be low. The thickness of the separator is preferably less than 100 μm, more preferably from 40 to 80 μm.

Further, the plurality of paper layers constituting the multilayered paper for the separator may all have the same properties, or may be a combination of paper layers having different properties. In such a case, every paper layer may independently be a paper layer (hereinafter referred to as a paper layer A) made of a cellulose paper layer having a density of from 0.37 to 0.60 $g/cm^3$, or it may preferably be a combination with a paper layer having a lower density than the paper layer A, so that the impregnation property for an electrode can be improved.

As a structure to obtain a large capacitance for an electric double layer capacitor, a plurality of electrodes may be laminated with a separator interposed therebetween, or a pair of strip electrodes may be wound with a separator interposed therebetween, to form an element, and this element may be accommodated in a casing. In such an element, the electrodes and the separator are intimately laminated, and when an electrolyte is impregnated thereto, if the density of the separator is high, it takes time to impregnate the electrolyte to the element, and the productivity of the electric double layer capacitor tends to be poor. On the other hand, if the density of the separator is low, short circuiting is likely to result, and no adequate insulation between the positive and negative electrodes can be made.

Whereas, the separator in the present invention is a multilayered paper prepared by laminating at least one more paper layer on a paper layer A, whereby the positive and negative electrodes can adequately be insulated, and self discharge is little. However, with the paper layer A, the thickness is thin and the density is relatively high, and in the element having the above-mentioned large capacitance type structure, the impregnation speed of the electrolyte is slow. Therefore, it is preferred to use a multilayered paper prepared by laminating a paper layer A with a paper layer having a lower density than the paper layer A. It is particularly preferred to employ a multilayered paper prepared by laminating a paper layer A with a paper layer (hereinafter referred to as a paper layer B) made of cellulose paper having a density of from 0.15 to 0.36 $g/cm^3$.

In the case of the above multilayered paper, when an electrolyte is impregnated to an element having a large capacitance type structure, the electrolyte will pass through the paper layer B having a low density to spread over the entire element, whereby the impregnation speed of the electrolyte will be very high.

In the present invention, as the paper layer A, any one of a cellulose type electrolytic paper, a paper made of rayon fibers and a mixed paper made of cellulose and glass fibers, may, for example, be used. Particularly preferred is a paper prepared to contain at least 50 wt % of fibers obtained by beating regenerated cellulose fibers. Here, the regenerated cellulose fibers as the starting material are regenerated cellulose fibers which can be beaten by a beating machine installed in a usual paper-making process, such as regenerated cellulose fibers having a high polymerization degree, or solvent-spun rayon fibers.

The beatable regenerated cellulose fibers will be uniformly fibrillated and will have flexibility increased by the beating treatment. Accordingly, the paper layer prepared to contain at least 50 wt % of such fibers, is excellent in tensile strength. Further, the fibers fibrillated by beating treatment, are extremely dense, and the cross sections of fibrils are substantially circular. Accordingly, the paper layer prepared to contain at least 50 wt % of such fibers, is excellent in ion permeability and has a low resistance, even if it is of a high density.

Other material to be incorporated to the beaten regenerated cellulose fibers, is not particularly limited, and any fibers such as Manila hemp, sisal or kraft pulp, may be used. Such a material is preferably beaten depending upon the degree of beating of the regenerated cellulose fibers.

The paper layer B may be made of any material such as Manila hemp, sisal, kraft pulp or regenerated cellulose fibers.

The separator in the present invention can be prepared, for example, as follows. Firstly, beatable regenerated cellulose fibers cut into a few mm are beaten to a proper degree by a beating machine. On the other hand, fibers to be used as a blend material are likewise beaten to a proper degree, followed by mixing so that the regenerated cellulose fibers are contained in an amount of at least 50 wt %, whereupon a paper having a predetermined thickness is prepared. A plurality of sheets of paper thus obtained are laminated, or such a sheet is laminated with a paper prepared by any other method, into one sheet on a paper-making machine to obtain a multilayered paper, which is used as the separator. The plurality of paper layers may be used as a separator simply by overlaying one on another without being laminated. In such a case, so long as the liquid-absorbing property and the liquid-holding property for an electrolyte and the insulating property are concerned, the effects of the present invention can be expected, but such a method is not preferred, since a step of overlaying a plurality of separators will be an additional step especially in the case of an electric double layer capacitor having a large capacitance type structure.

The cellulose paper usually contains from 3 to 10 wt % of water. In order to reduce leakage current and to secure high withstand voltage for an electric double layer capacitor having a non-aqueous electrolyte, it is preferred to remove such water. When a cellulose paper is used as a paper layer for a separator, the water content in the cellulose paper is preferably at most 1 wt %.

In the electric double layer capacitor of the present invention, the electrodes for both positive and negative electrodes, are carbonaceous electrodes comprising a carbon material as the main component, and the capacitor is based on a principle that electric charge is stored in an electric double layer formed at the interface between the electrodes and the electrolyte. To increase the capacitance of an electric double layer capacitor, the specific surface area of the carbon material is preferably large, and the carbonaceous electrodes are preferably made of a carbon material having a specific surface area of from 700 to 2,500 $m^2/g$ and an organic binder.

As the carbon material, activated carbon, carbon black or polyacene may, for example, be used. To the carbonaceous electrodes, an electrically conductive material may be incorporated to increase the electrical conductivity, as the case requires. An organic binder is added to the carbon material, and the carbonaceous electrode is formed into a sheet shape on a metal current collector so that it is integrated with the current collector to form an electrode assembly. The organic binder to be used here, may preferably be, for example, a polyvinylidene fluoride, a polytetrafluoroethylene, a polyimide resin or a polyamideimide resin. The metal current collector may, for example, be a foil, a net or the like of e.g. aluminum or stainless steel. Particularly preferred is aluminum, since it is light in weight and has a low resistance.

The electrolyte to be used for an electric double layer capacitor includes an aqueous electrolyte and a non-aqueous electrolyte. However, the withstand voltage is about 0.8 V with the aqueous electrolyte, while it is about 2.5 V with the non-aqueous electrolyte. The electrostatic energy of an electric double layer capacitor is proportional to the square of the withstand voltage. Accordingly, from the viewpoint of the energy density, it is preferred to use the non-aqueous electrolyte, as the energy density can be made larger by about 9 times.

The solute for the non-aqueous electrolyte for the electric double layer capacitor of the present invention is preferably at least one salt comprising a quaternary onium cation represented by $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion such as $BF_4^-$, $PF_6^-$, $SO_3CF_3^-$, $AsF_6^-$, $N(SO_2CF_3)_2^-$ or $ClO_4^-$.

Further, the organic solvent to be used for the non-aqueous electrolyte is preferably a cyclic carbonate such as ethylene carbonate, propylene carbonate or butylene carbonate, a linear carbonate such as dimethyl carbonate, ethyl methyl carbonate or diethyl carbonate, acetonitrile, sulfolane or a sulfolane derivative. It is particularly preferably at least one member selected from the group consisting of propylene carbonate, ethylene carbonate, dimethyl carbonate, diethyl carbonate, methyl ethyl carbonate, sulfolane and methylsulfolane.

As the shape of the electric double layer capacitor of the present invention, preferred is a cylindrical type prepared in such a manner that a pair of elongated electrodes are wound with an elongated separator interposed therebetween, to form an element, and the element is impregnated with a non-aqueous electrolyte and accommodated in a bottomed cylindrical casing, or an angular type prepared in such a manner that a plurality of rectangular electrodes as positive and negative electrodes are alternately laminated with a separator interposed therebetween, to form an element, and the element is impregnated with a non-aqueous electrolyte and accommodated in a bottomed angular casing, since it is thereby possible to obtain a large capacitance.

Now, the present invention will be described in further detail with reference to Examples. However, it should be understood that the present invention is by no means restricted to such specific Examples.

EXAMPLE 1

Solvent-spun rayon was beaten, and using it, a paper having a thickness of 35 µm and a density of 0.40 g/cm³ was prepared. This paper and a paper made of Manila hemp having a thickness of 30 µm and a density of 0.35 g/cm³ were laminated by a paper-making machine to obtain a double layered paper having a thickness of 65 µm.

A mixture comprising 80 wt % of activated carbon having a specific surface area of 1,800 m /g, 10 wt % of carbon black and 10 wt % of polytetrafluoroethylene as a binder, was kneaded while adding ethanol dropwisely, followed by rolling to obtain a sheet electrode having a thickness of 180 µm. This electrode was dried at 200° C. for 30 minutes to remove ethanol and then bonded by means of a conductive adhesive on a portion having a width of 6 cm and a length of 13 cm on each side of an aluminum foil current collector having a thickness of 40 µm and having a lead and further roll-pressed to obtain an electrode integrated with the current collector, having a thickness of 410 µm, which was used for both positive and negative electrodes.

19 Sheets of the positive electrode and 19 sheets of the negative electrode were alternately laminated via the above-mentioned double layered paper as a separator, to obtain a laminated element. However, as the positive and negative electrodes as the outermost layers, electrodes having a sheet electrode bonded only on one side of a current collector, were employed. This element was accommodated in a bottomed angular aluminum casing having a height of 15 cm, a width of 7 cm and a thickness of 2.2 cm, and the respective leads are welded by ultrasonic welding to a positive terminal and a negative terminal attached airtightly and insulatedly to an aluminum top cover having an injection hole. Then, the top cover was fit in an opening of the angular casing, and the peripheral portion was welded for sealing by laser welding.

Then, vacuum drying treatment was carried out at 200° C. for 24 hours in such a state that the injection hole of the top cover was open. Then, using as an electrolyte a solution prepared by dissolving 1.5 mol/l of triethylmonomethylammonium tetrafluoroborate in propylene carbonate, the electrolyte was vacuum impregnated to the above element from the above-mentioned injection hole, and then the injection hole was airtightly sealed by attaching a safety valve thereto, to obtain an electric double layer capacitor cell.

The above electric double layer capacitor cell was charged at a constant voltage of 2.5 V for 30 minutes and then discharged at a constant current of 50 A to 1.0 V, whereby the capacitance was determined from the gradient of the discharge curve from 2.5 V to 1.0 V. Further, the internal resistance was calculated from the voltage drop at the initial stage of discharge. Further, after charging at a constant voltage of 2.5 V for 48 hours, the cell was left to stand in an open circuit state, and the holding voltage upon expiration of 72 hours, was measured. Further, the time required for impregnation when a predetermined amount of the electrolyte was vacuum-impregnated to the element, was measured, and the measured time was taken as the time for impregnation of the electrolyte. The results are shown in Table 1.

EXAMPLE 2

Solvent-spun rayon was beaten, and using it, a paper having a thickness of 35 µm and a density of 0.40 g/cm³ and a paper having a thickness of 30 µm and a density of 0.26 g/cm³ were prepared. These two sheets of papers were laminated by a paper-making machine to obtain a double layered paper having a thickness of 65 µm. An electric double layer capacitor cell was prepared in the same manner as in Example 1 except that this double layered paper was used as the separator. Using this cell, evaluation was carried out in the same manner as in Example 1. The results are shown in Table 1.

EXAMPLE 3

(Comparative Example)

Solvent-spun rayon was beaten, and using it, a paper having a thickness of 65 µm and a density of 0.40 g/cm³ was prepared. An electric double layer capacitor cell was prepared in the same manner as in Example 1 except that this paper was used as the separator. using this cell, evaluation was carried out in the same manner as in Example 1. The results are shown in Table 1.

EXAMPLE 4

(Comparative Example)

Two sheets of paper made of Manila hemp having a thickness of 32.5 μm and a density of 0.35 g/cm³, were laminated by a paper-making machine to obtain a double layered paper having a thickness of 65 μm. An electric double layer capacitor cell was prepared in the same manner as in Example 1 except that this double layered paper was used as the separator. Using this cell, evaluation was carried out in the same manner as in Example 1. The results are shown in Table 1.

TABLE 1

|  | Capacitance (F) | Resistance (mΩ) | Time (sec) for impregnation of the electrolyte | Holding voltage (V) upon expiration of 72 hours |
|---|---|---|---|---|
| Ex. 1 | 1,844 | 2.2 | 56 | 2.4 |
| Ex. 2 | 1,817 | 2.1 | 55 | 2.4 |
| Ex. 3 | 1,810 | 2.8 | 350 | 2.4 |
| Ex. 4 | 1,820 | 1.9 | 45 | 0.0 |

According to the present invention, it is possible to obtain an electric double layer capacitor which has a low internal resistance and is excellent in the voltage-holding property with little self discharge and which has a high capacitance density. Further, the electric double layer capacitor of the present invention can be produced with good production efficiency, since the separator has an excellent impregnation property for an electrolyte. The electric double layer capacitor of the present invention is useful particularly for a wound type or laminated type electric double layer capacitor for a large capacitance or a large current, whereby the discharge capacitance is from 50 to 20,000 F or the discharge current is from 1 to 1,000 A.

What is claimed is:

1. An electric double layer capacitor having an element impregnated with a non-aqueous electrolyte, said element comprising positive and negative electrodes made from carbonaceous material, and a separator interposed between the electrodes, wherein said separator is made of at least two paper layers laminated to form one sheet, each of the paper layers has a thickness of from 20 to 60 μm, and at least one of the paper layers is a cellulose paper layer having a density of from 0.37 to 0.60 g/cm³, and one of the paper layers is a cellulose paper layer having a density of from 0.15 to 0.36 g/cm³.

2. The electric double layer capacitor according to claim 1, wherein the cellulose paper layer having a density of from 0.37 to 0.60 g/cm³ is a paper prepared to contain at least 50 wt % of fibers obtained by beating regenerated cellulose fibers.

3. The electric double layer capacitor according to claim 1, wherein the separator has a thickness of from 40 to 80 μm.

4. The electric double layer capacitor according to claim 1, wherein the carbonaceous electrodes are made of a carbon material having a specific surface area of from 700 to 2,500 m²/g and an organic binder.

5. The electric double layer capacitor according to claim 1, wherein the solute of the non-aqueous electrolyte is a salt comprising a quaternary onium cation represented by $R^1R^2R^3R^4N^+$ or $R^1R^2R^3R^4P^+$, wherein each of $R^1$, $R^2$, $R^3$ and $R^4$ which are independent of each other, is a $C_{1-6}$ alkyl group, and an anion of $BF_4^-$, $PF_6^-$, $SO_3CF_3^-$, $AsF_6^-$, $N(SO_2CF_3)_2^-$ or $ClO_4^-$, and the solvent of the non-aqueous electrolyte is at least one member selected from the group consisting of propylene carbonate, ethylene carbonate, dimethyl carbonate, diethyl carbonate, methyl ethyl carbonate, acetonitrile, sulfolane and methylsulfolane.

6. A separator for an electric double layer capacitor, which separator is suitable to be disposed between positive and negative electrodes made from carbonaceous material, and which is made of at least two paper layers laminated to form one sheet, each of the paper layers has a thickness of from 20 to 60 μm, and at least one of the paper layers is a cellulose paper layer having a density of from 0.37 to 0.60 g/cm³, and one of the paper layers is a cellulose paper layer having a density of from 0.15 to 0.36 g/cm³.

7. The separator for an electric double layer capacitor according to claim 6, wherein the cellulose paper layer having a density of from 0.37 to 0.60 g/cm³ is a paper prepared to contain at least 50 wt % of fibers obtained by beating regenerated cellulose fibers.

8. The separator for an electric double layer capacitor according to claim 6, which has a thickness of from 40 to 80 μm.

9. The separator for an electric double layer capacitor according to claim 6, which has a porosity of from 60 to 90%.

* * * * *